United States Patent

Ayranto

[15] 3,657,869
[45] Apr. 25, 1972

[54] FLAIL

[72] Inventor: Roy O. Ayranto, Winnipeg, Manitoba, Canada

[73] Assignee: Anthes Imperial Limited, Toronto A.M.F., Ontario, Canada

[22] Filed: Dec. 1, 1969

[21] Appl. No.: 881,075

[52] U.S. Cl. .............................................. 56/294, 56/295
[51] Int. Cl. .................................................... A01d 55/20
[58] Field of Search .................... 56/295, 294, 504, 505, 289

[56] References Cited

UNITED STATES PATENTS

| | | | |
|---|---|---|---|
| 2,924,058 | 2/1960 | Brooks | 56/295 |
| 2,932,147 | 4/1960 | Beeston, Jr. | 56/295 |
| 3,003,298 | 10/1961 | Wininger | 56/295 X |
| 3,043,080 | 7/1962 | Mott | 56/294 |
| 3,102,376 | 9/1963 | Henderson | 56/294 |
| 3,103,093 | 9/1963 | House, Jr. | 56/295 |
| 3,122,871 | 3/1964 | Frevik et al. | 56/294 |
| 3,247,657 | 4/1966 | Scarnato et al. | 56/295 |
| 3,315,451 | 4/1967 | Hill | 56/295 |
| 3,422,611 | 1/1969 | Barows | 56/294 |

Primary Examiner—Robert Peshock
Assistant Examiner—James A. Oliff
Attorney—Fetherstonhaugh & Co.

[57] ABSTRACT

A cutter of the type which is rotatably mounted in a rotary mower stalk shredder or the like comprising at least one cutter blade element having a longitudinal axis. The blade element is formed to provide a pair of generally longitudinally extending side edges and at least one primary cutting edge. The primary cutting edge is located at one end of the blade and it is obliquely disposed relative to the longitudinal axis of the blade. Mounting means are provided at the other end of the blade for mounting the cutter blade element for rotation about a rotational axis with the longitudinal axis extending substantially radially outwardly of the rotational axis such that the primary cutting edge may be obliquely disposed in the direction of rotation of the blades. By disposing the blade in this manner, the primary cutting edge will slide relative to the crop as it cuts through the crop.

2 Claims, 7 Drawing Figures

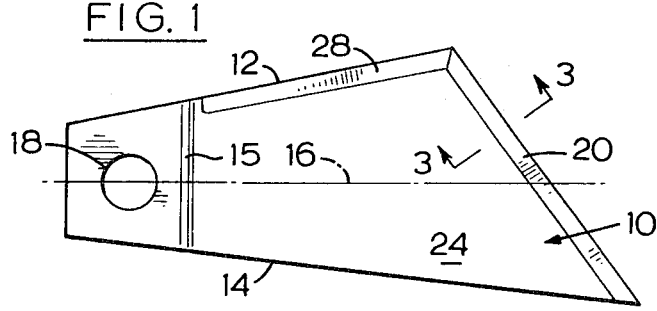
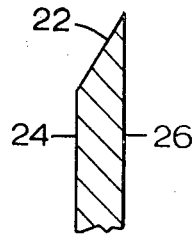
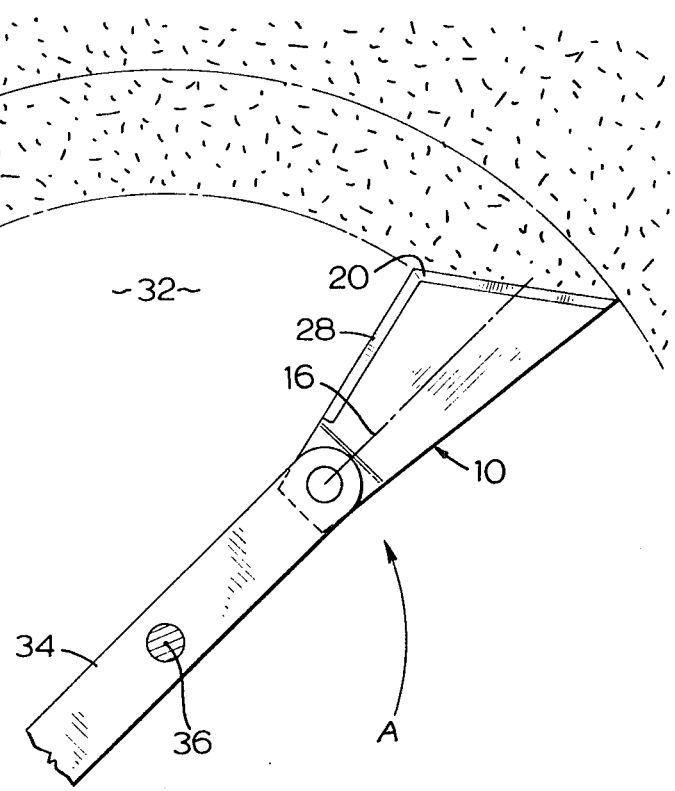

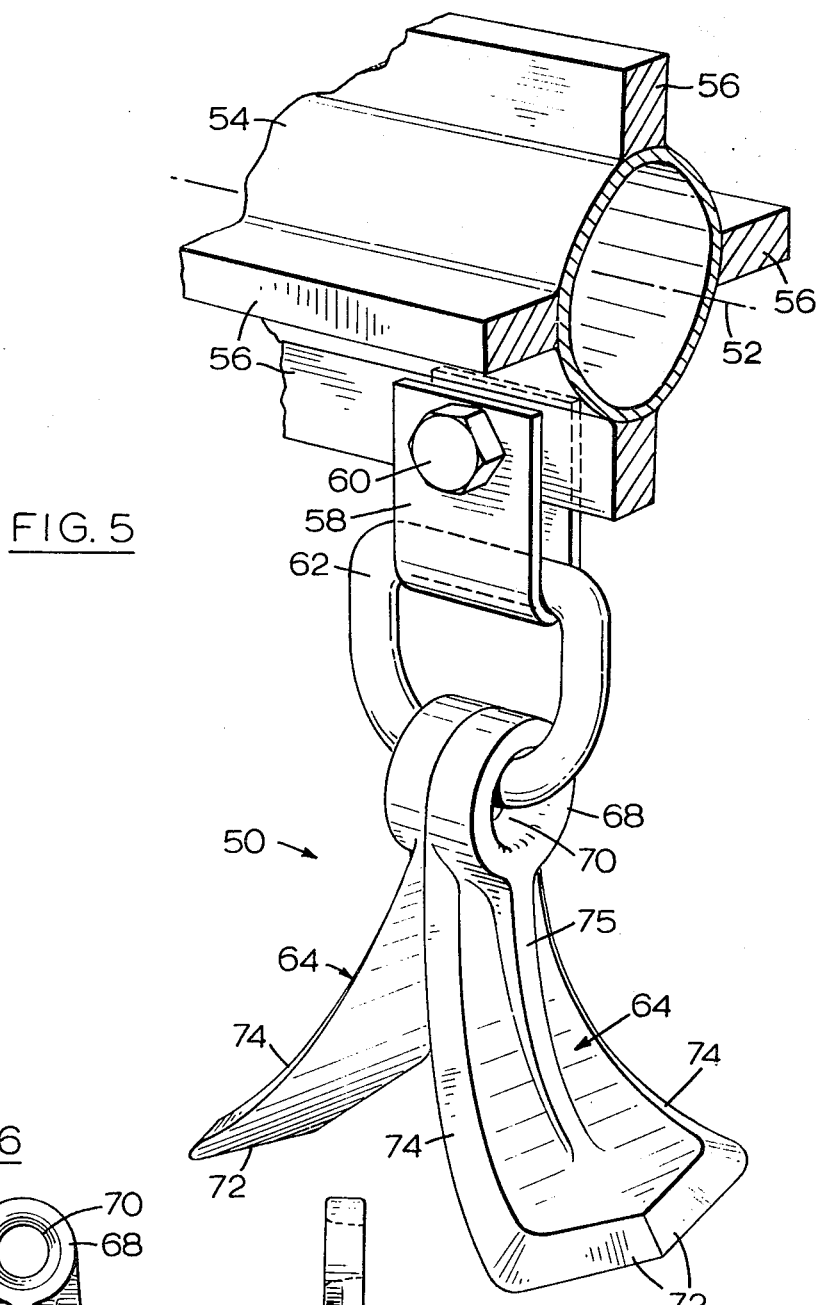
FIG. 5
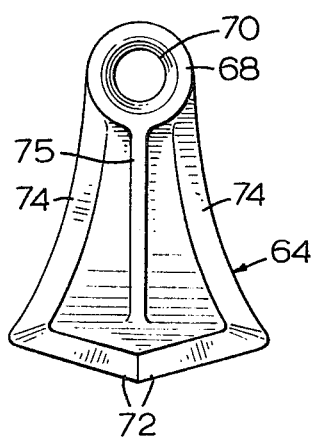
FIG. 6
FIG. 7
INVENTOR.
ROY O. AYRANTO
BY *Fetherstonhaugh & Co.*
ATTORNEYS

FLAIL

FIELD OF INVENTION

This invention relates to cutters for use in stalk shredders, rotary mowers and the like. In particular, the invention relates to an improved cutter blade for use in rotary mowers and stalk shredders.

PRIOR ART

Rotary mowers are extensively used in agriculture and they are capable of cutting grass, weeds, bushes and brush and the like. The conventional blade used in the rotary mower generally has a cutting edge which is disposed substantially radially with respect to the axis of rotation of the blade. As a result of this configuration, the cutting action is a chopping action. The cutting edge of the blade does not slide lengthwise relative to the stalk which is being cut and, consequently, the cutting edge becomes dull very rapidly. Frequent re-sharpening of the blade is costly and time-consuming. In addition, the power consumption of a mower which employs this conventional cutter blade is quite substantial. The power consumption of the mower is related to the efficiency of the cutting action and it has been found that the chopping action of the conventional cutter blade is relatively inefficient.

The problems discussed above with respect to rotary mowers are also encountered in stalk shredder machines. The stalk shredder machines differ from the conventional mowers in that the blades are generally rotated about a horizontal axis. The blades of the stalk shredder are frequently referred to as "flail knives" and they are adapted to shred stalks, stubble, weeds and the like in use. The blade elements which do the actual cutting or shredding are generally similar to those used in a rotary mower except the body of the blade is bent at 90° to dispose the cutting edge in a horizontal plane. Again, the cutting action is a chopping action in that there is no longitudinal relative movement between the cutting edge and the stalk.

SUMMARY

The cutter, according to the present invention, provides a more efficient cutting action with the result that it does not require to be sharpened as frequently as the known cutter blades described above. In addition, the efficiency of the cutting action is such that the power of consumption of the mower or shredder is reduced thereby effecting a saving in running costs.

According to an embodiment of the present invention, a cutter of the type which is rotatably mounted in a rotary mower stalk shredder or the like comprises at least one cutter blade element having a longitudinal axis. The blade element is formed to provide a pair of generally longitudinally extending side edges and at least one primary cutting edge. The primary cutting edge is located at one end of the blade and it is obliquely disposed relative to the longitudinal axis of the blade. Mounting means are provided at the other end of the blade for mounting the cutter blade element for rotation about a rotational axis with the longitudinal axis extending substantially radially outwardly of the rotational axis such that the primary cutting edge may be obliquely disposed in the direction of rotation of the blades. By disposing the blade in this manner, the primary cutting edge will slide relative to the crop as it cuts through the crop.

The invention will be more clearly understood after reference to the following detailed specification read in conjunction with the drawings.

FIG. 1 is a plan view of a rotary mower cutter blade according to an embodiment of the present invention;

FIG. 2 is a side view of the blade of FIG. 1;

FIG. 3 is a sectional view taken along the line 3—3 of FIG. 1;

FIG. 4 is a plan view of a rotary mower blade mounted for rotation and illustrating the cutting action;

FIG. 5 is a pictorial view of a stalk shredder flail according to an embodiment of the present invention;

FIG. 6 is a front view of the blade element of FIG. 5; and

FIG. 7 is a side view of the blade element of FIG. 6.

Referring to FIG. 1 of the drawings, it will be seen that the blade 10 has a pair of side edges 12 and 14 which extend generally longitudinally of the blade. The longitudinal axis of the blade may be taken to be the axis 16. As shown in FIG. 2, the blade is bent upon itself at 15 to dispose a major portion thereof in a plane which is spaced from the plane of the mounting end. This is done to ensure that the blade support will not be damaged frequently in use. An opening 18 is formed at one end of the blade to permit the blade to be mounted on a rotary mower as will be described hereinafter. A primary cutting edge 20 is located at the other end of the blade. The cutting edge 20 is formed by a bevelled edge 22, as shown in FIG. 3, which extends in an angle from the front face 24 to the back face 26 of the blade element. The primary cutting edge 20 is obliquely disposed relative to the longitudinal axis 16. While the primary cutting edge is generally responsible for cutting the major portion of the crop as the mower advances, as shown in FIG. 4 of the drawings, preferably a secondary cutting edge 28 is formed at the side edge 12 of the blade to cut portions of the crop which are not cut by the primary cutting edge due to too rapidly an advance of the mower or simply failure to cut cleanly in the first swipe. The secondary cutting edge is formed in the same manner as the primary cutting edge, illustrated in FIG. 3.

The method of operation of the blade illustrated in FIGS. 1, 2 and 3 will be more readily understood with reference to FIG. 4 of the drawings. In FIG. 4 of the drawings, the reference numeral 30 is applied to an area illustrating uncut crop while the reference numeral 32 is applied to an area wherein the crop has been cut by the previous rotation of a blade 10. The blade 10 is mounted on a support arm 34 for rotation about a substantially vertical axis 36. It will be understood that normally, at least two blades will be mounted for rotation about the axis 36. However, for the purpose of illustration of the cutting action, the blade which is normally mounted at the other end of the support arm 34 is not shown. It will be noted that the blade 10 is mounted such that the longitudinal axis 16 thereof extends generally radially from the axis of rotation 36. In the position shown, the blade is mounted for rotation in the direction of the arrow A. It will be noted that the primary cutting edge 20 and the secondary cutting edge 28 are disposed in the direction of rotation of the blade. The portion of the uncut crop 30 enclosed between the broken lines 38 and 40 will be cut by the primary cutting edge as it rotates about the axis 36. It will be seen that the cutting action of the primary cutting edge 20 is a slicing action rather than a chopping action, that is to say, the cutting edge will move longitudinally relative to the stalk of the crop as it cuts through the stalk. It has been found that this cutting action considerably reduces the wear on the cutting edge and the power consumption of the machine in use.

The secondary cutting edge 28 serves to cut portions of the crop which were not cut by the previous swath of the preceding blade in which lie inwardly of the broken line 38. Obviously, it is difficult to control the forward movement of the apparatus within accurate limits of the width of the swath of the primary cutting edge and the secondary cutting edge serves to alleviate this problem.

The same general principles may be applied to the flail 50 which is illustrated in FIG. 5. The flail 50 is mounted in a conventional manner for rotation about the horizontal axis 52 of the drive shaft 54. Four support plates 56 extend radially outwardly from the shaft 54 and a plurality of flails may be mounted on each support plate at longitudinally spaced intervals. For the purposes of illustration, only one flail is shown in FIG. 5. The U-shaped bracket 58 is bolted to the support frame 56 by a conventional set screw 60 to receive a D-shaped ring 62. D-shaped ring 62 is free to pivot within the bracket 58. The flail illustrated in FIG. 5 consists of two blade elements 64 which are mounted in a back-to-back relationship on the D-shaped ring 62. The structure of the individual blades 65 is illustrated in FIGS. 6 and 7. Each of the blades 64 are formed symmetrically about a generally longitudinally extending axis. A boss 68 is formed at one end with a passageway 70 to permit the blades to be mounted on the D-shaped ring 62. A pair of primary cutting edges 72 are formed at the cutter edge of the blade to form an outwardly projecting V-shaped outer edge. Secondary cutting edges 74 are formed at the side edges of the blade. The side edges 74 diverge relative to one another in a direction towards the primary cutting edge such that more material is provided in the area of the primary cutting edge. This feature permits the blades to be re-sharpened a considerable number of times before they have to be replaced without requiring any additional material in the areas which are not subject to the same amount of wear as the primary cutting edge. The body of each blade element 64 is curved outwardly at its outer end such that the primary cutting edges of each blade will be disposed outwardly from one another when located in the position shown in FIG. 5. A reinforcing rib 75 is formed in the blade to add rigidity.

The two blades 64 are mounted on the D-shaped ring 62 and are freely suspended in the position shown in FIG. 5. It will be understood that the D-shaped ring 62 is closed after the blades are fitted thereon. The two blades 64 may be freely mounted relative to one another or they may be secured together by welding their upper ends to retain the relative position shown in FIG. 5.

In use, the shaft 54 is rotated about horizontal axis 52 such that one primary cutting edge and one secondary cutting edge of each blade is disposed in the direction of rotation to cut or shred the crop in use. If, after considerable use, the efficiency of the cutting operation deteriorates as a result of the cutting edges becoming dull, the D-shaped ring 62 may be detached and relocated with the other primary and secondary cutting edges of each blade element being disposed in the direction of rotation.

Various modifications of the embodiments described above will be apparent to those skilled in the art without departing from the spirit of the present invention. For example, the blade illustrated in FIG. 1 may be formed without the secondary cutting edge. However, for reasons described hereinbefore, the secondary cutting edge is preferably formed. It will also be apparent that the blade illustrated in FIG. 1 could be in the double-edged form shown in FIGS. 5 to 7 such that it would be reversible, it being understood that the same effect could be achieved by reversing the direction of rotation of the support. If the blade of FIGS. 1 - 4 is made reversible, the offset may have to be removed or other adjustment made to ensure that the cutting edge is disposed at a low level.

What I claim is:

1. A double-edge cutter of the type which is rotatably mounted in a crop cutting machine comprising, two cutter blade elements having a longitudinal axis, each of said blade elements being formed to provide a pair of generally longitudinally extending side edges and at least two primary cutting edges, said primary cutting edges being located at one end of said blade element and obliquely disposed relative to their adjacent longitudinally extending side edges to form an outwardly projecting V-shaped outer end of said blade element, mounting means consisting of an enlarged boss at the other end of said blade element for mounting said cutter blade element for rotation about a rotational axis with said longitudinal axis extending substantially radially outwardly of the rotational axis such that either one of said primary cutting edges may be obliquely disposed in the direction of rotation of the blade to form a leading cutting edge whereby upon rotation of the blade the leading primary cutting edge may slide relative to the crop as it cuts through the crop, said side edges diverging in a direction towards the end of the blade element at which the primary cutting edge is located.

2. A cutter of the type which is rotatably mounted in a crop cutting machine comprising, a cutter blade element having a longitudinal axis, said blade element being formed to provide a pair of generally longitudinally extending side edges and at least two primary cutting edges, said primary cutting edges being located at one end of said blade element, and obliquely disposed relative to their adjacent longitudinally extending side edges to form an outwardly projecting V-shaped outer end of said blade element, mounting means consisting of an enlarged boss at the other end of said blade element for mounting said cutter blade element for rotation about a rotational axis with said longitudinal axis extending substantially radially outwardly of the rotational axis such that either one of said primary cutting edges may be obliquely disposed in the direction of rotation of the blade to form a leading cutting edge whereby upon rotation of the blade the leading primary cutting edge may slide relative to the crop as it cuts through the crop, said side edges diverging in a direction towards the end of the blade element at which the primary cutting edge is located.

* * * * *